03-27-73    OR    3,722,985

United States Patent [19]
Laliberte et al.

[11] 3,722,985
[45] Mar. 27, 1973

[54] NIGHT-VISION TRAINING GOGGLES

[75] Inventors: Albert J. Laliberte, Woodstock, Conn.; Ralph A. Richardson, North Brookfield, Mass.

[73] Assignee: Omnitech Inc., Southbridge, Mass.

[22] Filed: Sept. 4, 1970

[21] Appl. No.: 69,854

[52] U.S. Cl. ...................... 350/311, 351/2, 351/44
[51] Int. Cl. ................................. G02b 5/20
[58] Field of Search ........ 350/311, 1; 351/2, 44, 163; 2/7, 8, 14 J; 117/33.3; 161/408; 252/300

[56] References Cited

UNITED STATES PATENTS

| | | | |
|---|---|---|---|
| 2,816,047 | 12/1957 | Mahler | 350/311 |
| 3,382,183 | 5/1968 | Donoian et al. | 252/300 |
| 3,484,156 | 12/1969 | Militello | 351/44 |

OTHER PUBLICATIONS

Coblentz et al., "Spectral-Transmissive Properties and Use of Colored Eye-Protective Glasses" National Bureau of Standards C421, 1938, pages 2-3 relied upon.
Young, Glass Industry, Vol. 47, No. 4, Apr. 1966, pp. 189-193.

*Primary Examiner*—David Schonberg
*Assistant Examiner*—Ronald J. Stern
*Attorney*—Shenier and O'Connor

[57] ABSTRACT

A night-vision training goggles lens formed as a unitary piece covering both eyes from a single thickness of a press-polished, dark-green-transparent sheet of synthetic resin having a color response providing a visual transmittance peak at a wave length between 5400 A. and 5600 A. and having an optical density between six and seven.

7 Claims, 5 Drawing Figures

PATENTED MAR 27 1973 3,722,985
SHEET 1 OF 2
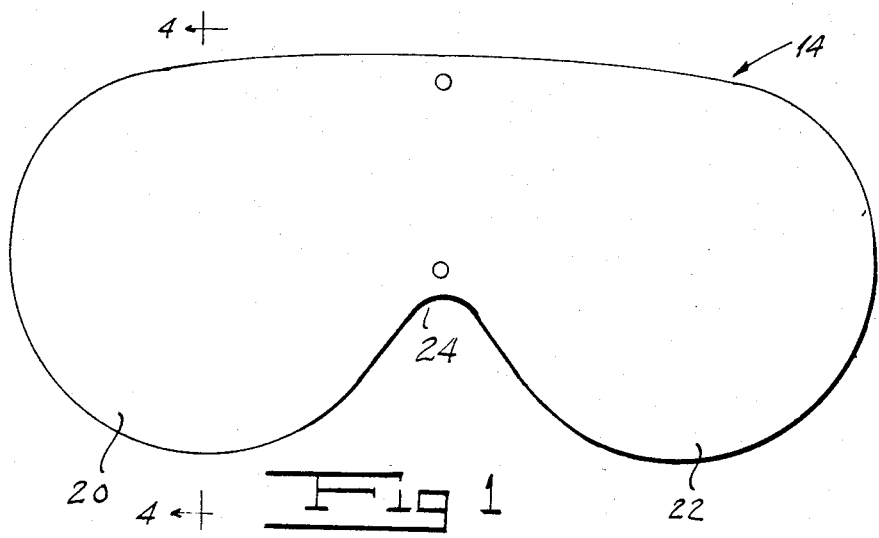
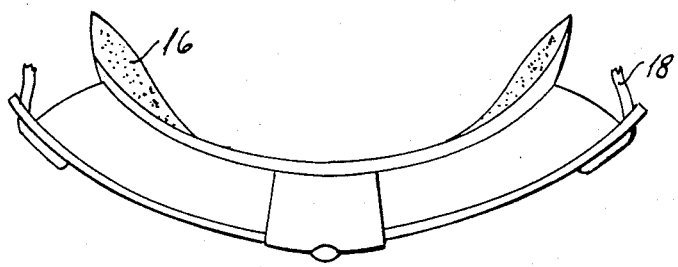
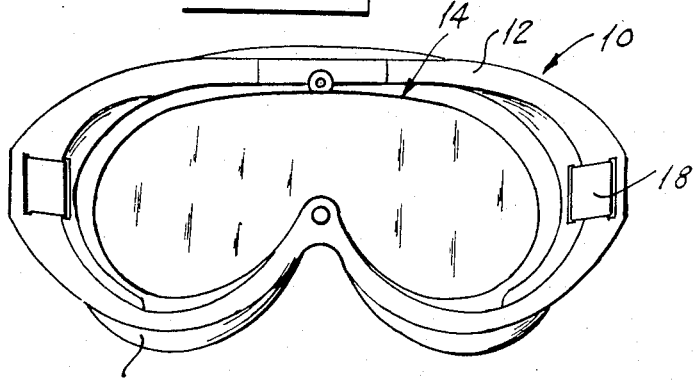
INVENTORS
ALBERT J. LALIBERTE
RALPH A. RICHARDSON
BY
Shanier & O'Connor
ATTORNEYS

INVENTORS
ALBERT J. LALIBERTE
RALPH A. RICHARDSON

NIGHT-VISION TRAINING GOGGLES

BACKGROUND OF THE INVENTION

It is well known that the eye functions differently in perceiving objects at night or under conditions of low illumination than it does under daylight conditions. In military and naval activities, personnel often are required to operate under darkened conditions at night. The accommodation to night vision and perception of objects at night and the performance of actions under darkened conditions are not inherent but require training and experience. For example, a watch-stander on shipboard at night is first instructed to look slightly above the horizon better to be able to distinguish objects on the horizon.

It is, of course, desirable that inexperienced personnel be given some training to prepare them for operation under darkened conditions before they are actually subjected to combat operations and the like under those conditions. It is, moreover, desirable that an instructor be able clearly to observe the actions of trainees under simulated darkened conditions. That is, the instructor should be operating under daylight conditions while the trainees are subjected to simulated night conditions. In addition to the foregoing, it is desirable that a person preparing to enter a night-time atmosphere from an illuminated place be pre-conditioned to darkness.

It has been proposed in order to achieve the above desiderata that goggles be devised provided with a lens which simulates darkened conditions for a person wearing the goggles during daytime. Various attempts to provide a lens which satisfies the foregoing conditions have not been entirely successful, that is, while one lens might simulate darkened conditions on a moonlight night, a different lens was required to simulate conditions on a cloudy night. The lenses which have heretofore been proposed were composite lenses which are relatively expensive. It is further required of the lens that it be able to stand relatively rough handling without scratching or the like. Preferably, it should be adapted to be used for existing goggles.

We have invented a night-vision training goggles lens which overcomes the defects in lenses of the prior art. Our lens effectively simulates the darkened conditions both of a moonlit night and of a cloudy night to a person in daylight. It is rugged and will withstand rough usage without appreciable damage. It is appreciably less expensive than are lenses of the prior art intended to simulate night conditions. It is adapted to be used with preexisting goggles.

SUMMARY OF THE INVENTION

One object of our invention is to provide a nightvision training goggles lens which overcomes the defects of lenses of the prior art intended for this purpose.

Another object of our invention is to provide a night-vision training goggles lens for closely simulating night conditions of a moonlit night and of a cloudy night to the wearer.

A further object of our invention is to provide a night-vision training goggles lens which is rugged.

Still another object of our invention is too provide a night-vision training goggles lens which is relatively inexpensive as compared with lenses of the prior art intended for this purpose.

A further object of our invention is to provide a night-vision training goggles lens which can be used in a pre-existing goggles structure.

Other and further objects of our invention will appear from the following description.

In general our invention contemplates the provision of a night-vision training goggles lens formed from a single thickness of press-polished, dark-green-transparent synthetic resin having a color response providing a visual transmittance peak at a wave length between 5400 A. and 5600 A. and having an optical density between six and seven.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a plan view of our night-vision training goggles lens before being assembled in goggles;

FIG. 2 is a top plan view of night-vision training goggles provided with our lens.

FIG. 3 is a front elevation of the night-vision training goggles shown in FIG. 2.

FIG. 4 is a sectional view of our night-vision training goggles lens taken along the line 4—4 of FIG. 1.

DESCRIPTION OF THE PREFERRED EMBODIMENT

Figure 5:
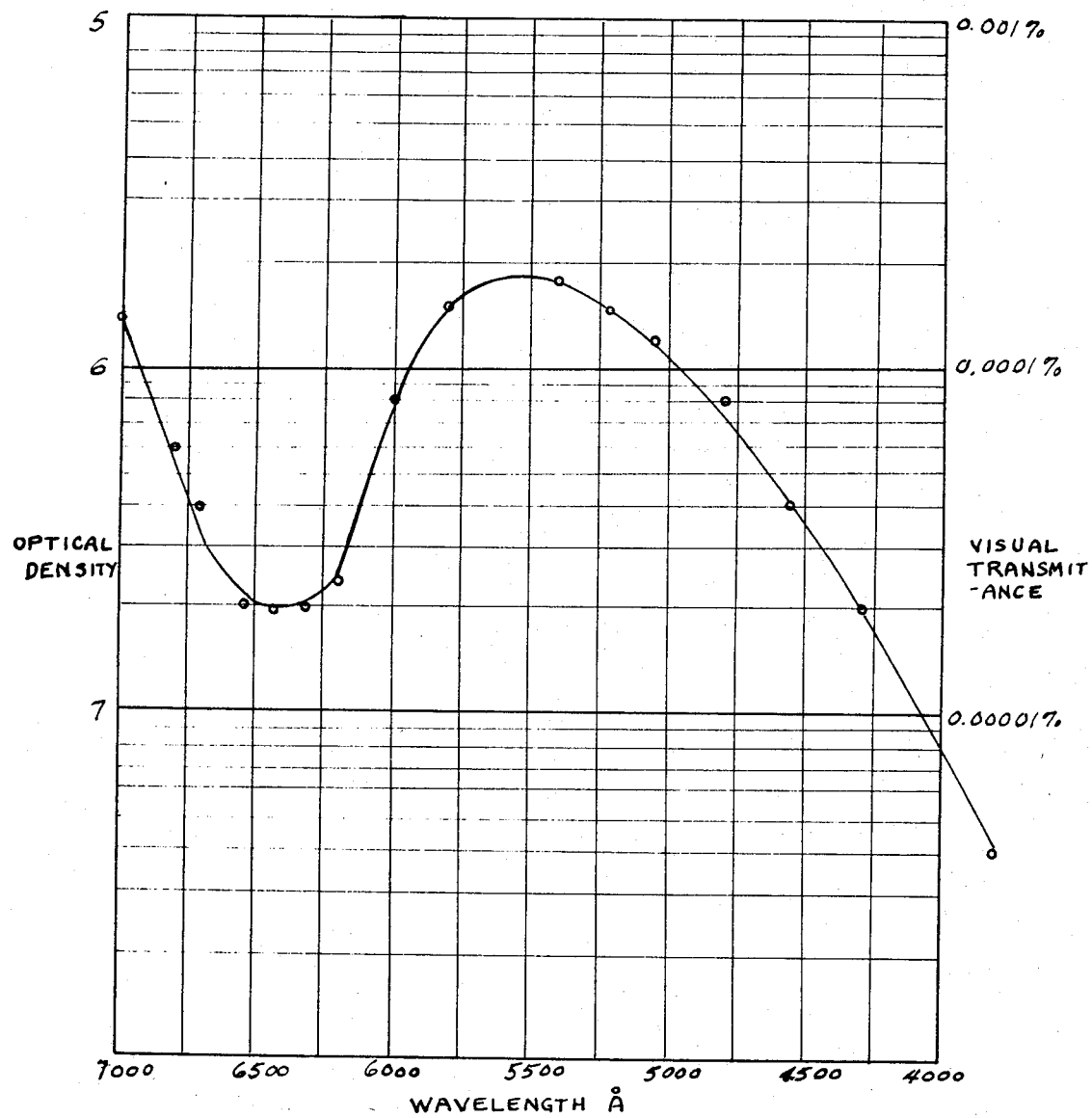
FIG. 5 is a schematic view illustrating the preferred color response characteristic of our night-vision training goggles lens.

Referring now to the drawings, night-vision training goggles indicated generally by the reference character 10 comprise a frame 12 adapted to receive our lens indicated generally by the reference character 14. Frame 12 also carries a pad 16 of any suitable material such as foam rubber adapted to fit closely to the wearer's face around his eyes to prevent extraneous light from entering into the space between the lens 14 and the wearer's eyes. A strap 18 carried by the frame 12 is adapted to be secured behind the wearer's head by any suitable means (not shown) to hold the goggles in position. Since the goggles 10, except for our lens 14, are known in the art, they will not be described in further detail.

We form our lens 14 from a material having a color response such as that shown in FIG. 5 which provides a peak of visual transmittance between about 5400 A. and 5600 A. and preferably at about 5500 A. The material, moreover, provides an optical density or average integrated value of density over the spectrum of between six and seven.

In FIG. 5 we have illustrated the color response curve of a material suitable for our lens. As is known in the art, transparency of a layer of material is the ratio of the intensity of the transmitted light to the intensity of the incident light while opacity is the reciprocal of the transparency. Optical density is the common logarithm of opacity or:

$$\text{Optical density} = \log_{10} (I_i/I_t)$$

where $I_i$ is the intensity of the incident light and $I_t$ is the intensity of the transmitted light.

More specifically, a material having this characteristic is a press-polished, dark-green-transparent, cellulose acetate sheet. The thickness of the sheet which we employ is between 0.030 inch and 0.045 inch, and preferably about 0.040 inch. Having determined the characteristics outlined above, a material having the correct characteristics was obtained as a custom order from Celanese Corporation as Color No. E-2256 in a cellulose acetate sheet designated Type S-700AA. While this particular material eminently suited our purposes, any other material possessing the color response characteristic and density outlined above might be employed. Such materials are available on special order from plastics manufacturers upon specification of the conditions to be met.

In forming our lens 14, we cut or stamp the blank shown in FIG. 1 so as to provide eye-covering portions 20 and 22 connected by a bridge which forms a nose bridge recess 24. After the lens is cut, it is assembled in the frame 12 in a manner known to the art.

In use of the goggles 10 provided with our lens 14, the trainee or the like in daylight dons the goggles so that the pad 16 closely fits against his face to prevent extraneous light from entering into the space between the lens and the wearer's eyes. The lens relatively closely simulates to the wearer the condition of night, whether it be considered to be a cloudy night or a moonlit night. Further, while the conditions apparent to the wearer are night conditions, he may be observed in daylight by an instructor who is not wearing such goggles.

It will readily be appreciated that, while we have described a preferred form of our invention which is a 0.040 inch thick lens formed from a particular material so as to provide an optical density between six and seven, the relationship between the thickness and the lens color may be varied and yet the same color characteristic and density will be provided. Once the color characteristic has been determined, the optical density can be increased either by adding more dye in the course of fabrication of the sheet or by making the sheet thicker.

It will be seen that we have accomplished the objects of our invention. We have provided night-vision training goggles lens which overcomes the defects of lenses of the prior art intended for this purpose. Our lens relatively closely simulates conditions of a moonlit night and of a cloudy night. It is relatively simple and is considerably less expensive than are lenses of the prior art intended to achieve the same result. It is rugged.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is to be limited to the specific details shown and described.

Having thus described our invention, what we claim is:

1. A night vision training goggle including in combination a lens consisting of a single thickness of polished synthetic resin having a color response providing a visual transmittance peak in the region of between 5400 A. and 5600 A. and an optical density at said peak of at least 5 and an average integrated value of optical density between 6 and 7 over the visible spectrum and means for supporting said lens on a wearer's head in front of his eyes.

2. A goggle as in claim 1 in which said peak is at approximately 5500 A.

3. A goggle as in claim 1 comprising respective eye portions connected by a bridge.

4. A goggle as in claim 1 having a thickness between 0.030 and 0.045 inches.

5. A goggle as in claim 1 in which said synthetic resin is cellulose acetate.

6. A night vision training goggle including in combination a lens consisting of a single thickness of polished cellulose acetate having a color response providing a visual transmittance peak in the region between 5400 A. and 5600 A. and an optical density at said peak of at least 5 and having an average integrated value of optical density between 6 and 7 over the visible spectrum, said thickness being between about 0.030 inches and about 0.045 inches and means for supporting said lens on a wearer's head in front of his eyes.

7. A goggle as in claim 6 in which said peak is at approximately 5500 A. and in which said thickness is approximately 0.040 inches.

* * * * *